United States Patent
Kothrade et al.

(10) Patent No.: US 6,187,884 B1
(45) Date of Patent: Feb. 13, 2001

(54) PREPARATION OF LOW MOLECULAR MASS HOMOPOLYMERS OF N-VINYLPYRROLIDONE

(75) Inventors: Stephan Kothrade, Limburgerhof; Rainer Blankenburg, Stuttgart-Feuerbach; Iris Peters, Lambsheim; Axel Sanner, Frankenthal, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/104,174

(22) Filed: Jun. 25, 1998

(30) Foreign Application Priority Data

Jun. 27, 1997 (DE) .............................. 197 27 476

(51) Int. Cl.$^7$ ..................................... C08F 2/38
(52) U.S. Cl. ............................. 526/212; 526/211
(58) Field of Search .................. 526/212, 211, 526/214, 223, 224, 236

(56) References Cited

U.S. PATENT DOCUMENTS

| 2,335,454 | 11/1943 | Schuster et al. . |
| 3,429,901 | * 2/1969 | Blood . |
| 3,862,915 | 1/1975 | Fried et al. . |
| 4,053,696 | 10/1977 | Herrle et al. ............................ 526/65 |
| 4,816,534 | 3/1989 | Nuber et al. ........................... 526/227 |
| 5,362,815 | 11/1994 | Shih et al. ........................ 525/326.9 |
| 5,773,545 | * 6/1998 | Schade ................................. 526/264 |
| 5,869,032 | * 2/1999 | Tropsch ............................ 424/70.15 |
| 5,919,882 | * 7/1999 | Ryles ................................... 526/306 |

FOREIGN PATENT DOCUMENTS

| 922378 | 7/1949 | (DE) . |
| 761699 | 9/1995 | (EP) . |
| 94/26796 | 11/1994 | (WO) . |

OTHER PUBLICATIONS

Haaf et al., *Polymer Journal*, vol. 17, No. 1, pp. 143–152, 1985.

* cited by examiner

Primary Examiner—Christopher Henderson
(74) Attorney, Agent, or Firm—Keil & Weinkauf

(57) ABSTRACT

A process for preparing highly concentrated aqueous solutions of low molecular mass homopolymers of N-vinylpyrrolidone by free-radical solution polymerization in an aqueous medium with $H_2O_2$ as initiator comprises carrying out the polymerization in the presence of from 0.1 to 30% by weight, based on N-vinylpyrrolidone, of a polymerization regulator which is selected from the group consisting of $C_1$–$C_6$-alkanols, hydroxylamine salts and water-soluble compounds containing sulfur in bonded form.

9 Claims, No Drawings

PREPARATION OF LOW MOLECULAR MASS HOMOPOLYMERS OF N-VINYLPYRROLIDONE

BACKGROUND OF THE INVENTION

FIELD OF THE INVENTION

The present invention relates to a process for preparing highly concentrated aqueous solutions of low molecular mass homopolymers of N-vinylpyrrolidone.

The preparation of N-vinylpyrrolidone polymers by free-radical polymerization is known. The mechanism of polymerization under various conditions is described, for example, in Polymer Journal, 17 (1985) 143–152. Polymerization in organic solvents, for example in alcoholic solution in accordance with U.S. Pat. No. 4,053,696, leads to polyvinylpyrrolidone of low molecular mass, since the organic solvents may act as chain regulators. To prepare highly concentrated aqueous solutions of the polymer, however, at least the majority of the organic solvents have to be distilled off and then either disposed of or reprocessed.

The polymerization of N-vinylpyrrolidone in aqueous solution has to date usually been carried out in the presence of hydrogen peroxide as initiator, as is described, for example, in U.S. Pat. No. 2,335,454. In this case the molecular weight of the polyvinylpyrrolidone depends on the hydrogen peroxide concentration: low molecular weights result from high hydrogen peroxide concentrations, and vice versa. Highly concentrated aqueous solutions of the polyvinylpyrrolidone, however, cannot be prepared, since high monomer concentrations of >30% by weight make it impossible to control the exothermic reaction, and in the case of feed techniques the highly grafting effect of the hydrogen peroxide leads to an unwanted buildup of molecular weight.

WO 94/26796 discloses the preparation of low molecular mass copolymers of N-vinylimidazole and N-vinylpyrrolidone using an azo initiator in aqueous solution in the presence of a sulfur compound as regulator.

DE 2 218 935 describes the polymerization of N-vinylpyrrolidone, alone or in a mixture with minor amounts of other monoolefinically unsaturated monomers, in an aqueous medium in the presence of water-insoluble polymerization catalysts which form free radicals and which are added in the form of a fine suspension in an aqueous solution of the N-vinylpyrrolidone polymers.

It is an object of the present invention to provide a simple process for preparing highly concentrated aqueous solutions of low molecular mass homopolymers of N-vinylpyrrolidone.

We have found that this object is achieved by carrying out polymerization in aqueous solution in the presence of particular polymerization regulators.

BRIEF SUMMARY OF THE INVENTION

The present invention therefore provides a process for preparing highly concentrated aqueous solutions of low molecular mass homopolymers of N-vinylpyrrolidone by free-radical solution polymerization in an aqueous medium with $H_2O_2$ as initiator, which comprises carrying out polymerization in the presence of from 0.1 to 30% by weight, based on the N-vinylpyrrolidone employed, of a polymerization regulator selected from the group consisting of $C_1$–$C_6$-alkanols, hydroxylamine salts and water-soluble compounds containing sulfur in bonded form.

One advantage of this process is the increased space-time yield of the polymerization plant. In addition, the highly concentrated polymer solutions are also advantageous in terms of transportation and of conversion to a powder product.

DETAILED DESCRIPTION OF THE INVENTION

Suitable initiators for the free-radical solution polymerization of the N-vinylpyrrolidone are those customary for aqueous solution polymerization. Preferred polymerization initiators include water-soluble peroxides and hydroperoxides, such as tert-butyl hydroperoxide, tert-amyl hydroperoxide, cumene hydroperoxide, pinane hydroperoxide, peroxodisulfuric acid and its salts, especially its alkali metal salts or ammonium salts, and also percarbonates, peroxo esters and hydrogen peroxide. It is preferred to use hydrogen peroxide. It is water-soluble, inexpensive, commercially available and does not contaminate the polymer solution with decomposition products. The initiator is employed in amounts of from 0.1 to 10% by weight, preferably from 0.5 to 5% by weight, based on the amount of N-vinylpyrrolidone. The commercially available 30 or 50% strength by weight solution if desired may be diluted to concentrations of about 10% by weight before being added to the reaction solution.

$H_2O_2$ is advantageously used together with transition metal compounds whose metal in aqueous solution is able to exist in different oxidation states, examples being iron(II) salts or copper(II) salts, i.e. redox initiator systems.

The polymerization medium used is water. Polymerization is preferably conducted at a pH in the range from 6 to 9 in order to avoid hydrolysis of the N-vinylpyrrolidone. Preferably, therefore, before beginning the polymerization the solutions of the individual components are adjusted to a pH within this range using a suitable base, such as aqueous sodium hydroxide or aqueous ammonia solution, or the pH of the reaction medium is kept within the range from 6 to 9 during polymerization by adding an appropriate base.

The polymerization temperatures should be chosen so that the half-lives of initiator decomposition are from 0.5 to 5 hours, preferably from 1 to 3 hours. This is usually the case at from 60 to 85° C. Therefore, polymerization is conducted preferably in the range from 60° C. to 85° C., in particular at from 65 to 80° C.

Polymerization is preferably conducted in the presence of polymerization regulators which contain sulfur in bonded form, as specified, for example, in WO 94/26796. Examples of such compounds include inorganic hydrogen sulfites, disulfites and dithionites or organic sulfides, disulfides, polysulfides, sulfoxides, sulfones and mercapto compounds. Specific examples of polymerization regulators are the following: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, di-t-butyl trisulfide and dimethyl sulfoxide. Compounds preferably employed as polymerization regulators are mercapto compounds, dialkyl sulfides, dialkyl disulfides and/or diaryl sulfides. Examples of these compounds are ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan. Of these, preference is given to the use of mercapto alcohols and mercapto carboxylic acids.

Other suitable regulators are hydroxylamine salts, such as hydroxylammonium sulfate.

Particularly preferred polymerization regulators are $C_1$–$C_6$ alcohols, of which ethanol, n-propanol and isopropanol are very particularly suitable.

The polymerization regulators are used in amounts of from 0.1 to 30% by weight, preferably from 0.1 to 20% by weight, based on the N-vinylpyrrolidone monomer employed in the polymerization. Mixtures of the polymerization regulators that are to be employed in accordance with the invention can also be used.

The polymerization of N-vinylpyrrolidone in water at a high monomer concentration of >30% by weight can for safety reasons not be carried out by the batch procedure. Consequently, semibatch techniques and feed techniques are preferably employed as polymerization methods. In the case of these process variants at least one of the components, or a mixture of two or more components, is added continuously or in portions within a certain period to a mixture of the remaining components. For instance, a solution of the polymerization regulator and an initiator solution can be added to a mixture of N-vinylpyrrolidone and water at the polymerization temperature. An alternative method is to add hydrogen peroxide to the initial charge, at or below the polymerization temperature, and to add only the regulator, or a solution of the regulator, to the reaction mixture within a predetermined period of time after the polymerization temperature has been reached. A further variant of the feed technique is to heat the initial charge to a temperature at which polymerization proceeds and then to add regulator, hydrogen peroxide and N-vinylpyrrolidone, in separate feed streams or together. With this technique the initial charge is a mixture of water and vinylpyrrolidone and/or hydrogen peroxide and/or regulator. A preferred procedure in accordance with the invention is that in which the polymerization regulator is metered in continuously or in portions during the polymerization of the monomers or is introduced in the initial charge.

The novel polyvinylpyrrolidone polymers obtained by this process have a weight-average molecular weight of from 2000 to 80,000, preferably from 5000 to 60,000. The K values of the novel polymers are within the range from 10 to 50, preferably from 15 to 40 (in accordance with H. Fikentscher, Cellulose-chemie 13, 1932, 58 to 64, 1% strength by weight solution in water at 25° C.). The novel highly concentrated polymer solutions usually have a solids content of from 40 to 80% by weight, preferably from 45 to 60% by weight. In addition they feature a narrow molecular weight distribution ($M_w/M_n \leq 7$).

The novel polymer solutions can if desired be subjected to physical aftertreatment following polymerization, for example to steam distillation or stripping with nitrogen, in the course of which volatile impurities are removed from the solution. The polymer solution can also be subjected to chemical aftertreatment with the addition of polymerization initiators (for example these mentioned above) and heating of the polymer solutions to temperatures which may be above the polymerization temperature.

The regulators present in the polymer solution, especially ethanol and isopropanol, can either remain in the product or be removed from the product by distillation, if desired. The N-vinylpyrrolidone homopolymers obtainable by the novel process are low in impurities such as 2-pyrrolidone or N-vinylpyrrolidone, with contents of 2-pyrrolidone of below 2.0% by weight based on the polymer. In particular, there are no initiator decomposition products.

The aqueous polyvinylpyrrolidone solutions can if desired be converted to solid powders by drying techniques in a manner known per se. Suitable drying techniques for producing pulverulent polymers are all those suitable for drying from an aqueous solution. Preferred techniques are those of spray drying, fluidized-bed spray drying, roller drying and belt drying; freeze drying and freeze concentration can likewise be employed.

The low molecular mass polyvinylpyrrolidone that is obtained in accordance with the invention is preferably employed in the form of a highly concentrated aqueous solution in cosmetic and pharmaceutical preparations, especially as a storage-stable disinfectant in a complex with iodine. The polyvinylpyrrolidones are also useful as detergent additives (for example, color transfer inhibitors) and for numerous technical applications (photoresists, thickeners, adhesives, auxiliaries for textile coloring, adhesive sticks, metal quenching baths, separation of precious metals, whiteners, complexes with antioxidants, concrete additives, coating of polyolefins/fibers, printing inks, dyeline paper bases, electrically conducting layers, electrode gels, skin adhesion gels, removal of polyvalent cations, removal of polyphenols, enzyme complexes, protein complexes, color mixing inhibitors, solid batteries, solid electrolytes, fish food granules, fixatives for perfume oils, flexographic printing plates, flocculants, photographic plates, gas analysis, plaster bandages, lubricants, adhesion promoters for colorants, hydrophilicization of surfaces, ion exchangers, isomerization inhibitors, protective colloids, graphics inks, jet inks, ballpoint pen pastes, catalysts, catheter coating, ceramic binders, scale removers, adhesive for nutrient media, complexing with organic or inorganic compounds to increase adsorbability/hydrophobicity, complexes with halogen, complexes with polymers, preservatives, contact lenses, dialysis membranes, corrosion protection, plastics additives, coatings auxiliaries, photosensitive materials, lithography, solubilization, air filters, membrane preparation, metal casting, metal hardening, stabilization of metal colloids, metal complexes for reversible oxygen absorption, microencapsulation, membranes, removal of oil and colorants from water, oil recovery, paper assistants, colored paper slips, phase transfer catalysts, photoimaging, pigment dispersions, proton conductors, wastewater cleaning products, seed dressing, seed coating, lubricant additives, silver halide emulsions, soil release, stabilization of peroxides, synthetic fibers, tertiary petroleum recovery, textile auxiliaries, separation of hydrocarbon mixtures, viscosity modification, heat-resistant coats, heat-sensitive coats, heat-sensitive resistors, water-soluble films, cigarette filters).

The examples which follow illustrate the invention without restricting it.

EXAMPLE 1

The following solutions were first prepared:
1. Initial charge consisting of 500 g of deionized water, 140 g of N-vinylpyrrolidone and 90 g of isopropanol.
2. Feedstream 1, consisting of 6.8 g of hydrogen peroxide (30% strength) and 0.26 ml of copper(II) chloride solution (0.01% strength).
3. Feedstream 2, consisting of 480 g of N-vinylpyrrolidone.
4. Feedstream 3, consisting of 7.5 g of hydrogen peroxide (30% strength), in 4 portions of 1.25 g and 1 portion of 2.5 g.
5. Feedstream 4, consisting of 0.66 ml of copper(II) chloride solution (0.01% strength) in 4 portions of 0.11 ml and 1 portion of 0.22 ml.

6. Feedstream 5, consisting of 100 g of ammonia solution (5% strength).
7. Feedstream 6, consisting of 3.0 g of hydrogen peroxide (30% strength) and 0.88 ml of copper(II) chloride solution (0.01% strength).
8. Feedstream 7, consisting of 3.0 g of hydrogen peroxide (30% strength) and 0.88 ml of copper(II) chloride solution (0.01% strength).
9. Feedstream 8, consisting of 3.0 g of hydrogen peroxide (30% strength).

The initial charge was heated to 75° C. under nitrogen and with stirring in a laboratory glass apparatus with anchor stirrer. On reaching the temperature, Feedstream 1 was added. A pH of 7.5 was maintained by metering in Feedstream 5 throughout the cycle period. Following the addition of Feedstream 1, Feedstream 2 was metered in over 2 hours. 0.5, 1, 1.5, 2 and 2.5 hours after beginning Feedstream 2, one portion each of Feedstreams 3 and 4 was added, the addition of the largest portion of each taking place after 2 hours. After the end of Feedstream 2 the temperature was held at 75° C. for a further 2 hours and then Feedstream 6 was added. After a further hour at 75° C., Feedstream 7 was added. The temperature was again held for 1 hour. Then Feedstream 8 was added and heating at 75° C. continued for 2 hours. After the reaction mixture had cooled the result was a clear, pale yellow and highly viscous polymer solution having a solids content of 51% by weight. The K value of the product (measured as a 1% strength by weight solution in water) was 30.3.

Comparative Example 1

First of all, the same solutions as in Example 1 were prepared, the isopropanol in Solution 1) being replaced by an equal amount of water. Polymerization was then carried out as described in Example 1.

After the reaction mixture had cooled the result was a clear, orange-yellow and highly viscous polymer solution having a solids content of 49.9% by weight. The K value of the product (measured as a 1% strength by weight solution in water) was 43.0.

The molecular weight of the polymers was also investigated by means of gel permeation chromatography. The eluent used was water/acetonitrile (90:10) with 0.15 M NaCl and 0.03 M $NaH_2PO_4$. The separation material used was TSK PW-xl 3000, TSK PW-xl 4000, TSK PW-xl 5000 and TSK PW-xl 6000 at a column temperature of 23° C. Detection was by UV photometry at 208 nm. Calibration was carried out with polyvinylpyrrolidone whose integral molecular weight distribution had been determined by laser light scatter coupling. The results are given in Table 1 below.

TABLE 1

Gel permeation chromatography (GPC) analyses of the products from Example 1 and Comparative Example 1

| Sample from | Number average Mn | Weight average Mw | Mw/Mn |
|---|---|---|---|
| Example 1 | 10,900 +/− 100 | 48,900 +/− 150 | 4.5 +/− 0.1 |
| Comparative Example | 17,000 +/− 300 | 226,000 +/− 6000 | 13.3 +/− 0.2 |

The Comparison Example shows that without regulators it is impossible to achieve the desired K value of around 30 (in other words, the weight average is in any case less than 60,000 or 80,000, respectively) in the case of the novel, concentrated procedure, and that an undesirably broad molecular weight distribution (Mw/Mn) is obtained. In addition, the resulting product is darker in color.

EXAMPLE 2

The following solutions were first prepared:
1. Initial charge consisting of 1000 g of deionized water, 280 g of N-vinylpyrrolidone and 180 g of isopropanol.
2. Feedstream 1, consisting of 13.6 g of hydrogen peroxide (30% strength) and 0.52 ml of copper(II) chloride solution (0.01% strength) and 5.0 g of 25% strength aqueous ammonia.
3. Feedstream 2, consisting of 960 g of N-vinylpyrrolidone.
4. Feedstream 3, consisting of 10.0 g of hydrogen peroxide (30% strength), in 4 portions of 2.5 g.
5. Feedstream 4, consisting of 0.88 ml of copper(II) chloride solution (0.01% strength) in 4 portions of 0.22 ml.
6. Feedstream 5, consisting of 91.0 g of aqueous ammonia (5% strength).
7. Feedstream 6, consisting of 6.0 g of hydrogen peroxide (30% strength) and 1.76 ml of copper(II) chloride solution (0.01% strength).
8. Feedstream 7, consisting of 6.0 g of hydrogen peroxide (30% strength) and 1.76 ml of copper(II) chloride solution (0.01% strength).
9. Feedstream 8, consisting of 6.0 g of hydrogen peroxide (30% strength).

The initial charge was heated to 75° C. under nitrogen and with stirring in a laboratory steel vessel with anchor stirrer. On reaching the temperature, Feedstream 1 was added. Feedstream 5 was metered in over 7 hours from the addition of Feedstream 1. Following the addition of Feedstream 1, Feedstream 2 was metered in over 2 hours. 0.5, 1, 1.5 and 2 hours after beginning Feedstream 2, one portion each of Feedstreams 3 and 4 was added. After the end of Feedstream 2 the temperature was held at 75° C. for a further 2 hours and then Feedstream 6 was added. After a further hour at 75° C., Feedstream 7 was added. The temperature was again held at 75° C. for 2 hour. Then Feedstream 8 was added and heating at 75° C. continued for 2 hours. The reaction mixture was then cooled to 35° C. and distilled under reduced pressure for 1.5 hours. After the reaction mixture had cooled the result was a clear, pale yellow and highly viscous polymer solution having a solids content of 58% by weight. The K value of the product (measured as a 1% strength by weight solution in water) was 31.0.

EXAMPLE 3

The following solutions were prepared:
Solutions 1) to 7) as in Example 1.
8. Feedstream 7, consisting of 9.30 g of tert-butyl hydroperoxide (70% strength).
9. Feedstream 8, consisting of 6.64 g of sodium sulfite and 20 g of deionized water.

The initial charge was heated to 75° C. under nitrogen and with stirring in a laboratory glass apparatus with anchor stirrer. On reaching the temperature, Feedstream 1 was added. A pH of 7.5 was maintained by metering in Feedstream 5 throughout the cycle period. Following the addition of Feedstream 1, Feedstream 2 was metered in over 2 hours. 0.5, 1, 1.5, 2 and 2.5 hours after beginning Feedstream 2, one portion each of Feedstreams 3 and 4 was added, the addition of the largest portion of each taking place after 2 hours. After the end of Feedstream 2 the temperature was held at 75° C. for a further 2 hours and then Feedstream 6 was added. After a further hour at 75° C. the batch was cooled to 60° C., then Feedstream 7 was added. Following the addition of Feedstream 7, Feedstream 8 was metered in over 1.5 hours, and the temperature of 60° C. was maintained for 3 hours. After the reaction mixture had cooled the result was a clear, virtually colorless and highly viscous polymer solution having a solids content of 51.8% by weight. The K value of the product (measured as a 1% strength by weight solution in water) was 29.4.

EXAMPLE 4

The following solutions were first prepared:

1. Initial charge consisting of 575 g of deionized water, 140 g of N-vinylpyrrolidone and 6.0 g of mercaptoethanol.
2. Feedstream 1, consisting of 6.8 g of hydrogen peroxide (30% strength) and 0.26 ml of copper(II) chloride solution (0.01% strength) and 2.63 g of Feedstream 5.
3. Feedstream 2, consisting of 480 g of N-vinylpyrrolidone.
4. Feedstream 3, consisting of 5.0 g of hydrogen peroxide (30% strength), in 4 portions of 1.25 g.
5. Feedstream 4, consisting of 0.44 ml of copper(II) chloride solution (0.01% strength) in 4 portions of 0.11 ml.
6. Feedstream 5, consisting of 25.0 ml of aqueous ammonia (25% strength).
7. Feedstream 6, consisting of 3.0 g of hydrogen peroxide (30% strength) and 0.88 ml of copper(II) chloride solution (0.01% strength).
8. Feedstream 7, consisting of 3.0 g of hydrogen peroxide (30% strength) and 0.88 ml of copper(II) chloride solution (0.01% strength).
9. Feedstream 8, consisting of 3.0 g of hydrogen peroxide (30% strength).

The initial charge was heated to 75° C. under nitrogen and with stirring in a laboratory glass apparatus with anchor stirrer. On reaching the temperature, Feedstream 1 was added. A pH of 7.5 was maintained by metering in Feedstream 5 throughout the cycle period. Following the addition of Feedstream 1, Feedstream 2 was metered in over 2 hours. 0.5, 1, 1.5 and 2 hours after beginning Feedstream 2, one portion each of Feedstreams 3 and 4 was added. After the end of Feedstream 2 the temperature was held at 75° C. for a further 1.5 hours and then Feedstream 6 was added. After a further hour at 75° C., Feedstream 7 was added. The temperature was again held for 1 hour. Then Feedstream 8 was added and heating at 75° C. continued for 2 hours. After the reaction mixture had cooled the result was a clear, yellow and highly viscous polymer solution having a solids content of 52.3% by weight. The K value of the product (measured as a 1% strength by weight solution in water) was 30.3.

What is claimed is:

1. A process for preparing an aqueous solution of low molecular mass homopolymers of N-vinylpyrrolidone having a weight average molecular mass of from 5000 to 60,000, which has a solids content of more than 45% by weight, the process being a free-radical solution polymerization in an aqueous medium with $H_2O_2$ as initiator, which comprises carrying out the polymerization in the presence of from 0.1 to 30% by weight, based on N-vinylpyrrolidone, of a polymerization regulator which is selected from the group consisting of $C_1$–$C_4$-alkanols.

2. A process as defined in claim 1, wherein said polymerization regulator is selected from the group consisting of ethanol, n-propanol and isopropanol.

3. A process as defined in claim 1, wherein said polymerization regulator is isopropanol.

4. A process as defined in claim 1, wherein said $H_2O_2$ initiator is employed in amounts of from 0.5 to 5% by weight, based on the amount of N-vinylpyrrolidone.

5. A process for preparing highly concentrated aqueous solutions of low molecular mass homopolymers of N-vinylpyrrolidone, which has a solids content of more than 45% by weight, the process being a free-radical solution polymerization in an aqueous medium with $H_2O_2$ as initiator, which comprises carrying out the polymerization in the presence of from 0.1 to 30% by weight, based on N-vinylpyrrolidone, of a polymerization regulator which is selected from the group consisting of ethanol, n-propanol or isopropanol.

6. A process as claimed in claim 5, wherein said polymerization regulator is employed in amounts of from 0.1 to 20% by weight, based on the amount of the monomer.

7. A process as claimed in claim 5, wherein said $H_2O_2$ initiator is employed in amounts of from 0.1 to 10% weight, based on the amount of N-vinylpyrrolidone.

8. A process as claimed in claim 5, wherein said $H_2O_2$ initiator is employed in amounts of from 0.5 to 5% by weight, based on the amount of N-vinylpyrrolidone.

9. A process as claimed in claim 5, wherein the low molecular mass homopolymer of N-vinylpyrrolidone has a Fikentscher k-value of from 15 to 40.

\* \* \* \* \*